United States Patent
Yuan et al.

(10) Patent No.: US 10,538,880 B2
(45) Date of Patent: Jan. 21, 2020

(54) METHOD AND COMPOSITION FOR DETACKIFYING ORGANIC CONTAMINANTS IN THE PROCESS OF PULPING AND PAPERMAKING

(71) Applicant: Ecolab USA Inc., St. Paul, MN (US)

(72) Inventors: Qing Qing Yuan, Shanghai (CN); Qun Dong, Shanghai (CN); Zhi Chen, Shanghai (CN); Jian Kun Shen, Shanghai (CN)

(73) Assignee: Ecolab USA Inc., St. Paul, MN (US)

(*) Notice: Subject to any disclaimer, the term of this patent is extended or adjusted under 35 U.S.C. 154(b) by 12 days.

(21) Appl. No.: 15/642,885

(22) Filed: Jul. 6, 2017

(65) Prior Publication Data

US 2017/0314203 A1    Nov. 2, 2017

Related U.S. Application Data

(63) Continuation of application No. 14/351,830, filed as application No. PCT/US2013/040388 on May 9, 2013, now abandoned.

(30) Foreign Application Priority Data

May 21, 2012   (CN) .......................... 2012 1 0159396

(51) Int. Cl.
| | | |
|---|---|---|
| *D21H 17/00* | (2006.01) | |
| *D21H 17/25* | (2006.01) | |
| *D21H 17/41* | (2006.01) | |
| *D21H 21/02* | (2006.01) | |
| *D21H 17/26* | (2006.01) | |
| *D21H 17/29* | (2006.01) | |
| *D21H 17/56* | (2006.01) | |
| *D21C 9/08* | (2006.01) | |
| *D21H 17/45* | (2006.01) | |
| *D21H 17/66* | (2006.01) | |

(52) U.S. Cl.
CPC .............. *D21H 17/74* (2013.01); *D21C 9/08* (2013.01); *D21H 17/00* (2013.01); *D21H 17/25* (2013.01); *D21H 17/26* (2013.01); *D21H 17/29* (2013.01); *D21H 17/41* (2013.01); *D21H 17/45* (2013.01); *D21H 17/56* (2013.01); *D21H 17/66* (2013.01); *D21H 21/02* (2013.01)

(58) Field of Classification Search
None
See application file for complete search history.

(56) References Cited

U.S. PATENT DOCUMENTS

| | | |
|---|---|---|
| 4,698,133 A | 10/1987 | Moreland |
| 4,871,424 A | 10/1989 | Dreisbach et al. |
| 4,886,575 A | 12/1989 | Moreland |
| 5,061,346 A * | 10/1991 | Taggart .................. D21H 17/00 162/175 |
| 5,074,961 A | 12/1991 | Dreisbach et al. |
| 5,292,403 A | 3/1994 | Dreisbach et al. |
| 5,540,814 A | 7/1996 | Curtis et al. |
| 5,556,510 A | 9/1996 | Dreisbach et al. |
| 5,723,021 A | 3/1998 | Nguyen |
| 5,885,419 A | 3/1999 | Nguyen et al. |
| 6,051,160 A | 4/2000 | Hlivka et al. |
| 6,461,477 B1 | 10/2002 | Nguyen et al. |
| 6,977,027 B2 | 12/2005 | Sharma et al. |
| 7,166,192 B2 | 1/2007 | van de Steeg et al. |
| 2002/0148576 A1 | 10/2002 | Nguyen et al. |
| 2003/0010578 A1 | 1/2003 | Hinton et al. |
| 2003/0150578 A1 | 8/2003 | Nguyen et al. |
| 2004/0231816 A1 | 11/2004 | Steeg et al. |
| 2006/0266488 A1 | 11/2006 | Doherty et al. |
| 2008/0029231 A1 | 2/2008 | Gu et al. |
| 2008/0169073 A1 | 7/2008 | Xu et al. |
| 2008/0283207 A1 | 11/2008 | Thomas |
| 2010/0304166 A1 * | 12/2010 | Kaser ...................... B41M 5/26 428/537.5 |
| 2010/0326923 A1 | 12/2010 | Miknevich et al. |
| 2011/0011546 A1 | 1/2011 | Rintala et al. |
| 2011/0253333 A1 | 10/2011 | Ban et al. |
| 2013/0190677 A1 | 7/2013 | Thomas et al. |

FOREIGN PATENT DOCUMENTS

| | | |
|---|---|---|
| CN | 101680172 A | 3/2010 |
| EP | 0845495 A2 | 6/1998 |
| WO | WO 2008/144304 A1 | 11/2008 |

OTHER PUBLICATIONS

Chinese State Intellectual Property Office, Search Report in Chinese Patent Application No. 2012101593965, dated Feb. 2, 2016, 1 p.
European Patent Office, Extended European Search Report in European Patent Application No. 13794674.5, dated Dec. 16, 2015, 6 pp.
Korean Intellectual Property Office, International Search Report in International Patent Application No. PCT/US2013/040388, dated Jul. 29, 2013, 5 pp.
Korean Intellectual Property Office, Written Opinion in International Patent Application No. PCT/US2013/040388, dated Jul. 29, 2013, 7 pp.

* cited by examiner

*Primary Examiner* — Jacob T Minskey

(74) *Attorney, Agent, or Firm* — Leydig, Voit and Mayer, Ltd.

(57) ABSTRACT

The present invention discloses a method for detackifying organic contaminants in the process of pulping and papermaking and a composition used for the same. Specifically, the invention discloses that the water circulation system of pulping and papermaking process can be provided with non-ionic cellulose ether and cationic coagulant in lower amount, through which, the deposition of organic contaminants can be inhibited under the synergistic action of pre-coagulation and detackification.

6 Claims, No Drawings

METHOD AND COMPOSITION FOR DETACKIFYING ORGANIC CONTAMINANTS IN THE PROCESS OF PULPING AND PAPERMAKING

CROSS-REFERENCE TO RELATED APPLICATIONS

This application is a continuation of U.S. patent application Ser. No. 14/351,830, filed Apr. 14, 2014, itself a national phase application of International (i.e., PCT) Application No. PCT/US2013/040388, filed May 9, 2013, itself claiming the benefit of Chinese Patent Application Serial No. 201210159396.5, filed May 21, 2012, each disclosure of which is incorporated herein by reference in its entirety.

TECHNICAL FIELD

The present invention relates to the pulping and papermaking industry, and especially, to a chemical processing method for detackifying organic contaminants in the process of pulping and papermaking and a composition used for the same.

BACKGROUND

The term organic contaminants in papermaking process refers to the interfering substances that have permanent or temporary physical tackiness and may influence runnability of paper machines and harm the quality of the paper or board product. The organic contaminants can be divided into two types depending on their sources, that is, pitch and stickies. Pitch refers to hydrophobic colloidal particles, including those released from woods, such as resin acids, fatty acids, triglycerides and unsaponifiable like sterol esters and waxes, and those introduced into the pulping process such as defoamers, rosin size, coatings, some components of alkaline sizing agents, etc. The stickies refer to adhesive materials derived from recycled fibers. The mixtures generally comprise pressure-sensitive adhesives, hot-melt adhesives, latex binders from coatings, ink adhesives, wet-strength resins, paraffin waxes, and other polymers.

When conditions of the paper machine system (for example, pH, temperature, water hardness, or shearing force of the system) suddenly change, the two types of tacky organic contaminants are apt to aggregate and deposit in the fabrics, felts, rolls, machine wires, belts, presses, and dryer surfaces of the paper machine system. As a result, the frequency of wash-ups, boil-outs, and paper breaks on the machine increase. Moreover, when formed deposits appear on final products in the form of paper defects such as pinholes, spots, specks, and others, paper quality will definitely be degraded and operational problems relating to the subsequent coating or printing processes will also occur.

Currently, with the rising use of recycled paper and high-yield mechanical pulp as raw materials, the increasing reuse of paper machine white water, and the increasing content of contaminants in recycled fiber, problems caused by pitch and stickies are increasing.

In the pulping and papermaking industry, chemical processing methods are generally used to inhibit or control the deposition of organic contaminants, thus solving the aforementioned problems. There are three chemical treatments that are commonly applied in paper mills: detackification, dispersion, and fixation.

The chemical compositions of organic contaminants produced in the process of pulping and papermaking may not be that similar, but, they have the common physical properties of low melting temperature/glass transition temperature and low surface energy (high hydrophobicity). This means that they are apt to agglomerate into larger particles when in water and adhere to interfaces of metal, plastics and other synthetic materials in the papermaking system to form deposits.

Inorganic passivators, including talc, bentonite, alum and others, were previously used widely as detackifiers in pulping and papermaking processes. Despite the advantage of low cost, they are usually used in a large amount, and the huge variance of their dispersity in water has limited their detackifying effectiveness in practice.

Now, detackifiers that are commonly used include mainly polymers of high hydrophilicity, for example, synthetic products of polyvinyl alcohol-vinyl acetate (U.S. Pat. Nos. 4,871,424 and 4,886,575), polyethylene glycol and modified polyethylene glycol (U.S. Patent Application No. 2008/0029231), polyethylene oxide and modified polyethylene oxide (European patent application No. 1993/0568229), polyacrylate-styrene (U.S. Patent Application Nos. 2002/0148576 and 2003/0150578), etc. Detackifiers commonly used also include natural products such as non-ionic cellulose ether (U.S. Pat. Nos. 4,698,133 and 5,074,961), serum albumin and globulin (U.S. Pat. No. 5,885,419).

For the detackifiers disclosed in the aforementioned references to play the function of effectively inhibiting organic deposits, they must be efficiently and selectively adsorbed to the hydrophobic surface of particles in a physical or chemical manner, and then these particles can be stably dispersed in water systems due to their increased surface energy. However, sources of pulp materials and application of chemical additives in paper mills vary enormously. This means that deposits like pitch and stickies have particular and complex categories and different consistencies as well. Therefore, detackifiers containing a single component cannot effectively solve the issues of deposition of organic contaminants.

U.S. Pat. No. 5,540,814 discloses a method of using modified cationic kaolin to remove stickies in wastepaper. This method can effectively reduce the number of stickies and dirt in finished pulp or paper products through sufficient surface cationization of an anionic kaolin with epichlorohydrin dimethylamine polymer or poly diallyl dimethyl ammonium halide. In addition, it can also facilitate the removal of ink by centrifugal cleaners.

U.S. Pat. No. 6,977,027 discloses a process to control stickies formation and remove anionic trashes from recycled old corrugated container furnish, old newsprint furnish, deinking pulp furnish, old magazine grade furnish, etc. by adding talc and tertiary or quaternary amine through the means of blending. Through this method, the forming of stickies can be effectively inhibited, and the amount of anionic trashes in the recycled fibers can be reduced.

U.S. Pat. Nos. 5,292,403 and 5,556,510 disclose a method of using a composite detackifier comprising a charged polymer and an oppositely charged surfactant to inhibit the deposition of organic contaminants in a pulping and papermaking system. The former (U.S. Pat. No. 5,292,403) applies carboxymethyl cellulose, carboxymethylated starch or polyacrylic acid, etc. as the anionic polymer, and for example, aliphatic amine or alkyl imidazoline, etc. as the cationic surfactant; while the latter (U.S. Pat. No. 5,556,510) applies cationic starch as cationic polymer and, for example, sodium soap of tall oil fatty acid as the anionic surfactant. Both of these detackifiers are highly surface active which may reduce the tackiness of pitch and stickies, thus preventing the deposition of such contaminants on deposition prone surfaces of the paper machine.

U.S. Pat. No. 5,723,021 discloses a method for inhibiting deposition of contaminants in a pulping and papermaking system. Specifically, the composite detackifier hereinto consists of three components: a polyvinyl alcohol having 50-100% hydrolysis, a high molecular weight gelatin protein, and a cationic polymer represented by polyamine or polyethyleneimine. As revealed from the results of examples, the above said tri-component detackifier has such advantages as high efficiency, good adaptability and good performance over a broad range of pH and water hardness. Additionally, there is no obvious negative impact on wet end retention and sizing.

U.S. Pat. No. 6,051,160 discloses a composition of detackifier consisting of a derivatized cationic guar and a styrene-maleic anhydride copolymer. This composition can be used as a pitch control agent in the process of pulping and papermaking, and it can also be used for the ionic balance of the papermaking system to some extent.

U.S. Pat. No. 6,461,477 discloses a method for inhibiting the deposition of organic contaminants in pulping and papermaking system. Specifically, this method is to add a structured protein (e.g., whey protein) and at least one of cationic polymer (e.g., poly (diallyldimethylammonium chloride), cationic starch, cationic cellulose derivatives, alum, etc.) into the pulp, or apply them to the deposition prone surfaces of papermaking machinery and equipment, so as to minimize the deposition of pitch and stickies.

U.S. patent application No. 2008/0169073 discloses a method for inhibiting the deposition of organic contaminants in pulping and papermaking system. Specifically, In this method, a combination of a lipase and a non-ionic polymeric detackifier (e.g., hydrophobically modified hydroxyethyl methyl cellulose, and/or polyvinyl acetate having 50-100% hydrolysis) are added into the pulp, or applied to the deposition prone process equipment surfaces, so as to minimize the deposition of pitch and stickies in papermaking mills who use virgin pulp, recycled pulp or the combinations.

U.S. Pat. No. 7,166,192 discloses a method of adding the combination of hydrophobically modified hydroxyethyl methyl cellulose and cationic polymers to control pitch and stickies. It can be seen from the results of turbidity and UV-Vis absorption spectra disclosed from the examples that, this method is mainly to help improving the role of the cationic polymer in retaining pitch and stickies on the paper fibers, by using hydrophobically modified hydroxyethyl cellulose ether, so as to realize the purpose of reducing the total deposits and optimizing the amount of papermaking retention aids. Obviously, this method is neither to disperse the pitch and stickies in the water system, nor to detackify them, but to fix them onto paper fibers, and then remove them from the paper machine system by retaining them in the finished paper.

To conclude, the aforementioned prior art disclosed methods for detackifying or re-dispersing or fixing the organic contaminants onto the paper fibers, in the process of pulping and papermaking through adding some substance or composition, so as to control or inhibit the deposition of the organic contaminants, namely, the pitch and stickies.

DESCRIPTION OF THE INVENTION

The purpose of the invention is to provide a detackifying treatment for organic contaminants to inhibit and control the deposition of organic contaminants in the process of pulping and papermaking. By adopting the method according to the invention, good detackifying results can be realized by very low amount of composite detackifier, so that the deposition of organic contaminants can be inhibited or controlled effectively. Wherein, in the field of the invention, detackifying treatment is to make organic contaminants absorb a water hydration layer by means of surface passivation to improve its surface energy and hydrophilicity, in order to achieve the purpose of reducing the deposition of the organic contaminants.

For this purpose, the invention discloses a method for detackifying organic contaminants in the process of pulping and papermaking, comprising adding an effective dose of non-ionic cellulose ether and cationic coagulant into water circulation system of pulping and papermaking process.

The invention further discloses a composition used for detackifying organic contaminants in the process of pulping and papermaking, comprising non-ionic cellulose ether and cationic coagulant.

The method and detackifying composition of the invention realize good detackification of organic contaminants though the synergistic effect of non-ionic cellulose ether and cationic coagulant. Cationic coagulant catches colloidal and/or micro-sized pitch and stickies etc. to form particle aggregates with the controllable size of generally less than 100-150 micrometers by means of pre-coagulation; while hydrophilic non-ionic cellulose ether may be adsorbed onto the surfaces of these pre-coagulated aggregates by physical means, so as to make them better dispersed into the water system due to improved hydration, rather than deposited in the system of pulping and papermaking or retention to the surface of paper fibers.

After a plurality of experiments, the inventors find that aforementioned synergistic action, comparing with the prior art of detackification technology, significantly enhances the absorbability of non-ionic cellulose ether to organic contaminants to realize effective detackification of organic contaminants at relatively lower dose of detackifier composition.

In the present invention, non-ionic cellulose ether may be selected from hydroxyethyl methyl cellulose, hydroxyethyl cellulose, hydroxypropyl methyl cellulose, hydroxypropyl cellulose, hydroxybutyl methyl cellulose, hydroxybutyl cellulose or the combination thereof. It is well known in prior art that the above-listed non-ionic cellulose ethers have relatively good water solubility and are cheap and easy to access.

In the presence of cationic coagulant, non-ionic cellulose ether with high molecular weight has better fluidity, and detackification capability of non-ionic cellulose ether has been significantly improved. Therefore, comparing with prior art, the method of the invention may have more broad selection of non-ionic cellulose ethers. In actual production, various non-ionic cellulose ethers and combinations thereof can be selected in response to the requirement of operating parameter in the process.

In the present invention, for the reason that there is no need for non-ionic cellulose ether to conduct special chemical modification, the process can be more simple and easy, which leads substantially same or similar result of organic contaminants detackification.

As for molecular weight of non-ionic cellulose ether, 10,000-1,000,000 is preferred, more preferred 50,000-500,000, and most preferred 80,000-250,000. Non-ionic cellulose ether in the said molecular weight range will have an improved synergistic effect with cationic coagulant.

A recommended molar degree of substitution of non-ionic cellulose ether of 0.01-3.0, 0.5-2.8 is preferred, and 1.5-2.5 is more preferred. In one embodiment of the invention, the molar degree of substitution of methoxy group of non-ionic cellulose ether may be 0-3.0, preferred 1.5-2.0; molar degree of substitution of hydroxypropyl group may be 0.01-0.5, preferred 0.1-0.3. Non-ionic cellulose ether with such range of degree of substitution will have improved synergy effect with cationic coagulant.

In the present invention, the cationic coagulant may be either inorganic coagulant or organic cationic coagulant. Wherein, inorganic coagulant includes but is not limited to aluminum sulfate, aluminum chloride, ferric sulfate, ferric chloride, polyaluminum sulfate, polyaluminum chloride, aluminum chlorohydrate, polyaluminum sulfate chloride, polyaluminum silicate chloride, polyferric chloride, polyferric sulfate, polyferric sulfate chloride, polyferric silicate chloride, and their combination. Organic cationic coagulant includes but is not limited to linear or crosslinked copolymers of epihalohydrin and aliphatic amine, poly (diallyl dimethyl ammonium chloride), copolymer and terpolymer containing cationic monomer of tertiary amino carboxylate, diallyl dimethyl ammonium chloride or vinylamine, melamine-formaldehyde resin, cationic starch, chitosan, cationic guar gum, and their combination.

In the present invention, the proportion of non-ionic cellulose ether and cationic coagulant (by weight) in the detackifier composition may be 1:0.1-1:100, more preferred 1:0.5-1:20, and most preferred 1:1-1:10. The proportion of non-ionic cellulose ether and cationic coagulant (by weight) may be varied in response to the source of pulp, the quantity and chemical properties of organic contaminants, or operating parameters in the process of pulping and papermaking.

In the present invention, the dosage of detackifier composition is the effective dosage for organic contaminants detackification, which is the understandable common content for those skilled in the art. The dosage that can be varied in response to tonnage of pulp to be treated and volume of water circulation system, is commonly 0.05-20 kilograms per ton of dry pulp base. Due to the synergy effect of non-ionic cellulose ether and cationic coagulant in the present invention, the dosage of the detackifier composition in the present invention which is preferred 0.1-5 kilograms per ton of dry pulp base, more preferred 0.25-2.5 kilograms per ton of dry pulp base, can be lower than that of prior art, based on same effect of detackification.

The detackifier composition of the present invention is effective for treating all pulps, including but not limited to recycled pulp, coated broke, deinked pulp, mechanical pulp, high-yield pulp, or combinations thereof. Furthermore, the detackifier composition of the present invention is effective for treating white water.

Wherein, organic contaminants in the present invention means interfering substances which have permanent or temporary physical tackiness and may impact the runnability of the paper machine and cause quality problems of paper, particularly means pitch and stickies produced in the process of pulping and papermaking.

In the present invention, the composition comprising non-ionic cellulose ether and cationic coagulant may be added at the same time at any stage of the process of pulping and papermaking, or non-ionic cellulose ether and cationic coagulant can be separately added at any stage. It is only necessary to guarantee that the said non-ionic cellulose ether and the said cationic coagulant would join together in pulp or in water circulation system of paper machine.

In the present invention, the composition comprising non-ionic cellulose ether and cationic coagulant may be added in any form (such as liquid, powder, aqueous carrier, etc.) in the process of pulping and papermaking.

In the present invention, the composition comprising non-ionic cellulose ether and cationic coagulant may be added by any means (such as injection, sprinkling, spraying, etc.) in the process of pulping and papermaking.

Furthermore, after treated by the method of the present invention, the organic contaminants, of which hydrophilicity is improved, can be better dispersed in the water system to effectively prevent the organic contaminants from precipitation and deposition onto papermaking equipment. Finally, the solution, with a plurality of organic contaminants dispersed, will be discharged out of circulation system of paper machine in mode of waste water discharge or in any other known mode.

Comparing with the prior art, the method for detackifying organic contaminants in the process of pulping and papermaking and composition used for the same disclosed by the present invention has the following advantages:

First, by pre-coagulation assisted detackification synergistic action of non-ionic cellulose ether and cationic coagulant, the adsorption of non-ionic cellulose ether to pitch and stickies has been enhanced to realize effective detackifying at lower amount of detackifier, so that the purpose of inhibiting deposits is achieved.

Second, there is no need to conduct any chemical modification to non-ionic cellulose ether used in the present invention. The process is simple and of low cost, which is easier to be operated and realized.

Third, the detackification of method and composition according to the present invention may not be affected by the pH and hardness of papermaking plant water system; meanwhile, the addition of cationic coagulant in the present invention can additionally provide ionic balance for stickies, which is particularly helpful for inhibiting and removing anionic trashes in paper fiber.

Fourth, foaming control performance resulted by adding and diluting detackifier composition is clearly greater than that of surfactant-type pitch control dispersant in the process of pulping and papermaking.

Fifth, the detackifier composition of the present invention may be applicable together with most chemical additives such as wet end retention, sizing, dry strength/wet strength additives etc. There is no negative effect on the operation of paper machine by the use of the composition itself and together with other chemical additives.

EXEMPLARY EMBODIMENTS

Standard pitch deposition test is used to evaluate the deposition inhibition effect of the detackifier composition and the method disclosed in the present invention on organic contaminant:

Standard pulp sample with 1.4% pulp consistency and Canadian standard freeness in the range of 450-500 mL at 20° C. is prepared using dry pulp laps in deionized water by Valley Beater. A synthetic pitch solution in isopropanol (i.e., 1 wt. %, 100 mL), and a calcium chloride solution (i.e., 5000 ppm as calcium ions, 5 mL) were added into 1 L standard pulp sample sequentially. Synthetic contaminants to be tested, of which both composition and proportion consistent with the those of wood pitch in hardwood and softwood (see the following table), is dispersed uniformly in the standard pulp sample in the form of colloids by gentle stirring. The only difference is that the pitch content in standard pulp sample used in test is much higher than actual content. Standard pulp sample is heated to 50° C. Stirring is continued for 1.5 hour at a constant stirring rate while the temperature is maintained. Meanwhile, the technique of quartz crystal microbalance (QCM) was applied to monitor the accumulated deposit mass on quartz crystal. The performance of the detackifier composition is also tested, wherein, after pulp sample to be tested is heated to 50° C., a certain dosage of composition is added for pre-treatment, then QCM test is conducted. Other preparation steps are the same.

Table of Synthetic Pitch Compositions

| | |
|---|---|
| Abietic acid | 5-50% |
| Oleic acid | 10-25% |
| Palmitic acid | 5-10% |
| Corn oil | 10-35% |
| Oleyl alcohol | 2.5-7.5% |
| Methyl stearate | 5-15% |
| Beta-sitosterol | 2.5-7.5% |
| Cholesteryl caproate | 2.5-7.5% |

Example 1

Hydroxyethyl cellulose (HEC) aqueous solution (8 wt. %) and epichlorohydrin-dimethylamine cross-linked copolymer (Epi-DMA) water solution (50 wt. %) is mixed with different combination proportion (proportion of 80/20, 60/40, 40/60 and 20/80 by weight); meanwhile, the detackification of organic contaminant for each composition is assessed by standard pitch deposition test. It can be seen from Table-1 that the compositions with certain proportion can detackify organic contaminants more effectively than either hydroxyethyl cellulose or organic cationic coagulant.

Wherein, blank test is a test during which any detackifier is not added.

TABLE 1

Pitch Deposition Test Results of Hydroxyethyl Cellulose/Organic Cationic Coagulant Compositions

| | Dosage (ppm) | Weight of accumulated pitch deposits (mg) | Detackification (%) |
|---|---|---|---|
| Blank test | — | 93.0 | 0 |
| HEC (8 wt % aq. solution) | 10 | 33.4 | 61.4 |
| Epi-DMA (50 wt % aq. solution) | 10 | 13.7 | 85.3 |
| HEC (8 wt %)/Epi-DMA (50 wt %) composition-80/20 | 10 | 24.3 | 73.9 |
| HEC (8 wt %)/Epi-DMA (50 wt %) composition-60/40 | 10 | 15.6 | 83.2 |
| HEC (8 wt %)/Epi-DMA (50 wt %) composition-40/60 | 10 | 8.9 | 90.4 |
| HEC (8 wt %)/Epi-DMA (50 wt %) composition-20/80 | 10 | 9.7 | 89.6 |
| HEC (8 wt % aq. solution) | 25 | 21.6 | 76.8 |
| Epi-DMA (50 wt % aq. solution) | 25 | 7.4 | 92.0 |
| HEC (8 wt %)/Epi-DMA (50 wt %) composition-80/20 | 25 | 7.4 | 92.0 |
| HEC (8 wt %)/Epi-DMA (50 wt %) composition-60/40 | 25 | 4.3 | 95.4 |
| HEC (8 wt %)/Epi-DMA (50 wt %) composition-40/60 | 25 | 2.6 | 97.2 |
| HEC (8 wt %)/Epi-DMA (50 wt %) composition-20/80 | 25 | 6.1 | 93.4 |

Example 2

Hydroxypropyl cellulose (HPC) aqueous solution (4 wt. %) and cationic starch (CS) aqueous solution (22 wt. %) is mixed with different combination proportion (proportion of 80/20, 60/40, 40/60 and 20/80 by weight); meanwhile, the detackification of organic contaminants for each composition is assessed by standard pitch deposition test. It can be seen from Table-2 that the compositions with certain proportion can detackify organic contaminants more effectively than either hydroxylpropyl cellulose or organic cationic coagulant.

TABLE 2

Pitch Deposition Test Results of Hydroxypropyl Cellulose/Organic Cationic Coagulant Compositions

| | Dosage (ppm) | Weight of accumulated pitch deposits (mg) | Detackification (%) |
|---|---|---|---|
| Blank test | — | 59.6 | 0 |
| HPC (4 wt % aq. solution) | 10 | 48.4 | 18.8 |
| CS (22 wt % aq. solution) | 10 | 12.8 | 78.5 |
| HPC (4 wt %)/CS (22 wt %) composition-80/20 | 10 | 29.8 | 50.0 |
| HPC (4 wt %)/CS (22 wt %) composition-60/40 | 10 | 7.5 | 87.4 |
| HPC (4 wt %)/CS (22 wt %) composition-40/60 | 10 | 4.9 | 91.8 |
| HPC (4 wt %)/CS (22 wt %) composition-20/80 | 10 | 5.8 | 90.3 |
| HPC (4 wt % aq. solution) | 25 | 32.9 | 44.8 |
| CS (22 wt % aq. solution) | 25 | 4.1 | 93.1 |
| HPC (4 wt %)/CS (22 wt %) composition-80/20 | 25 | 7.9 | 86.7 |
| HPC (4 wt %)/CS (22 wt %) composition-60/40 | 25 | 5.1 | 91.4 |
| HPC (4 wt %)/CS (22 wt %) composition-40/60 | 25 | 2.9 | 95.1 |
| HPC (4 wt %)/CS (22 wt %) composition-20/80 | 25 | 4.1 | 93.1 |

Example 3

Hydroxypropyl methyl cellulose (HPMC) aqueous solution (5 wt. %) and polyaluminum chloride (PAC) aqueous solution (50 wt. %) is mixed with different combination proportion (proportion of 80/20, 60/40, 40/60 and 20/80 by weight); meanwhile, the detackification of organic contaminants for each composition is assessed by standard pitch deposition test. It can be seen from Table-3 that the compositions with certain proportion can detackify organic contaminants more effectively than either hydroxypropyl methyl cellulose or inorganic coagulant.

TABLE 3

Pitch Deposition Test Results of Hydroxypropyl Methyl Cellulose/Inorganic Compositions

| | Dosage (ppm) | Weight of accumulated pitch deposits (mg) | Detackification (%) |
|---|---|---|---|
| Blank test | — | 77.1 | 0 |
| HPMC (5 wt % aq. solution) | 10 | 24.3 | 68.5 |
| PAC (50 wt % aq. solution) | 10 | 31.7 | 58.9 |

TABLE 3-continued

Pitch Deposition Test Results of Hydroxypropyl Methyl Cellulose/Inorganic Compositions

| | Dosage (ppm) | Weight of accumulated pitch deposits (mg) | Detackification (%) |
|---|---|---|---|
| HPMC (5 wt %)/PAC (50 wt %) composition-80/20 | 10 | 9.5 | 87.7 |
| HPMC (5 wt %)/PAC (50 wt %) composition-60/40 | 10 | 5.6 | 92.7 |
| HPMC (5 wt %)/PAC (50 wt %) composition-40/60 | 10 | 8.5 | 89.0 |
| HPMC (5 wt %)/PAC (50 wt %) composition-20/80 | 10 | 12.3 | 84.0 |
| HPMC (5 wt % aq. solution) | 25 | 13.4 | 82.6 |
| PAC (50 wt % aq. solution) | 25 | 15.8 | 79.5 |
| HPMC (5 wt %)/PAC (50 wt %) composition-80/20 | 25 | 5.6 | 92.7 |
| HPMC (5 wt %)/PAC (50 wt %) composition-60/40 | 25 | 2.9 | 96.2 |
| HPMC (5 wt %/PAC (50 wt %) composition-40/60 | 25 | 4.5 | 94.2 |
| HPMC (5 wt %/PAC (50 wt %) composition-20/80 | 25 | 8 | 89.6 |

The data from the Table 1-3 also indicate that low-dose of the detackifier composition of the present invention can effectively reduce tackiness of organic contaminants, so as to reduce deposition of organic contaminants effectively.

Purpose of the above embodiments is to further illuminate and describe technique scheme of the invention, rather than limiting the scope of protection of the invention. According to the content disclosed in the present invention, those skilled in the art may also conduct any modification and improvement, including proportion adjustment of non-ionic cellulose ether and cationic coagulant, selection of any non-ionic cellulose ether and cationic coagulant. Such modification and improvement are not go beyond the scope of protection.

We claim:

1. A composition useful for detackifying organic contaminants in the process of pulping and papermaking comprising a non-ionic cellulose ether and a cationic coagulant, wherein the cationic coagulant is an inorganic coagulant selected from the group consisting of aluminum sulfate, aluminum chloride, ferric sulfate, ferric chloride, polyaluminum sulfate, polyaluminum chloride, aluminum chlorohydrate, polyaluminum sulfate chloride, polyaluminum silicate chloride, polyferric chloride, polyferric sulfate, polyferric sulfate chloride, polyferric silicate chloride, and combinations thereof
   wherein the non-ionic cellulose ether is selected from the group consisting of hydroxyethyl methyl cellulose, hydroxyethyl cellulose, hydroxypropyl methyl cellulose, hydroxypropyl cellulose, hydroxybutyl methyl cellulose, hydroxybutyl cellulose, and combinations thereof;
   wherein the proportion by weight of the non-ionic cellulose ether and the cationic coagulant in the composition is 1:1 to 1:10.

2. The composition according to claim 1, wherein the non-ionic cellulose ether is selected from the group consisting of hydroxyethyl cellulose and hydroxypropyl methyl cellulose.

3. The composition according to claim 1, wherein the non-ionic cellulose ether has a molecular weight in the range from 10,000 to 1,000,000, and a molar degree of substitution in the range from 0.01 to 3.0.

4. The composition according to claim 1, wherein the non-ionic cellulose ether has a molecular weight in the range from 50,000 to 500,000, and a molar degree of substitution in the range from 0.5 to 2.8.

5. The composition according to claim 1, wherein the non-ionic cellulose ether has a molecular weight in the range from 80,000 to 250,000, and a molar degree of substitution in the range from 1.5 to 2.5.

6. The composition according to claim 1, wherein the non-ionic cellulose ether is hydroxypropyl methyl cellulose ("HPMC") and the cationic coagulant is polyaluminum chloride ("PAC").

* * * * *

UNITED STATES PATENT AND TRADEMARK OFFICE
CERTIFICATE OF CORRECTION

PATENT NO. : 10,538,880 B2
APPLICATION NO. : 15/642885
DATED : January 21, 2020
INVENTOR(S) : Qing Qing Yuan et al.

Page 1 of 1

It is certified that error appears in the above-identified patent and that said Letters Patent is hereby corrected as shown below:

In the Claims

In Column 10, Claim 1, Line 12, please replace "thereof" with --thereof;--.

Signed and Sealed this
Fourteenth Day of April, 2020

Andrei Iancu
*Director of the United States Patent and Trademark Office*